United States Patent
Zhou

(10) Patent No.: US 9,430,248 B2
(45) Date of Patent: Aug. 30, 2016

(54) BOOTING DISPLAY CONTROL METHOD AND ASSOCIATED APPARATUS

(71) Applicant: AutoChips Inc., Hefei, Anhui Province (CN)

(72) Inventor: Weibin Zhou, Hefei (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 245 days.

(21) Appl. No.: 14/246,092

(22) Filed: Apr. 5, 2014

(65) Prior Publication Data

US 2015/0019854 A1    Jan. 15, 2015

(30) Foreign Application Priority Data

Jul. 9, 2013   (CN) .......................... 2013 1 0286703

(51) Int. Cl.
*G08G 1/16* (2006.01)
*G06F 9/44* (2006.01)
*G02B 5/08* (2006.01)

(52) U.S. Cl.
CPC .................................. *G06F 9/4406* (2013.01)

(58) Field of Classification Search
CPC ........ G08G 1/16; G08G 1/166; G08G 1/167; G08G 1/165; G06F 9/4406; H04N 7/183
USPC ............. 701/36, 1; 340/425.5, 435; 348/148
See application file for complete search history.

(56) References Cited

U.S. PATENT DOCUMENTS

| 2004/0012488 A1* | 1/2004 | Schofield | B60Q 1/302 340/435 |
| 2009/0179745 A1* | 7/2009 | Okamoto | B60K 35/00 340/425.5 |
| 2015/0181175 A1* | 6/2015 | Camilleri | B60R 1/00 348/148 |

* cited by examiner

*Primary Examiner* — Tan Q Nguyen
(74) *Attorney, Agent, or Firm* — Cheng-Ju Chiang

(57) ABSTRACT

Booting display control method and associated apparatus are disclosed. The apparatus includes a processor chip, wherein the processor chip includes a processor and a display. After the processor chip is activated, the processor loads the leading program and displays control program; the processor detects whether a vehicle backing indicator indicates vehicle backing; when the vehicle backing indicator indicates vehicle backing, the processor controls the display controller to realize the vehicle backing video display function through the display control program; and when the vehicle backing indicator does not indicate vehicle backing, the processor loads the operating system program. Through the method, the present invention is capable of displaying vehicle backing video display when loading the operating system program.

16 Claims, 4 Drawing Sheets

BOOTING DISPLAY CONTROL METHOD AND ASSOCIATED APPARATUS

BACKGROUND

The disclosed embodiments of the present invention relate to automotive electronics, and more particularly, to a booting display control method and an associated apparatus.

As the trend of operating system (OS) based electronic device, more functions are implemented in the electronic device. Existing OS based electronic devices generally load OS programs after system booting, and supported functions are not able to be performed until the OS program is completely loaded.

At present, the field of automotive industry acquires short response time for vehicle backing video display. Vehicle backing video is required to be displayed in 3 seconds after a car is started up. To put it another way, in the field of car industry, an OS based electronic device needs to be ready for the display control functions in 3 seconds after booting.

Generally speaking, completely loading an OS program takes dozen seconds or even longer. If an user would like to view the vehicle backing video immediately after starting his/her car, he/she has to wait for a long time since the backing video can only be displayed after the OS program is completely loaded. An improved method is to add an extra display decoder chip to the automotive electronics device, wherein the extra display decoder chip controls screen display and video output. In this way, the vehicle backing display can be displayed directly by using this chip, therefore avoiding the issue mentioned above. However, it increases the cost since an extra chip is required.

SUMMARY

Therefore, one aspect of the present inventive subject matter is to provide a booting display control method and associated apparatus.

According to an embodiment of the present invention, a booting display control method is disclosed, and the method is based on a processor chip which includes a processor and a display controller. The method comprises: controlling the processor to load the leading program and display control program after the processor chip is activated; controlling the processor to detect whether a vehicle backing indicator indicates vehicle backing; controlling the processor to control the display controller to realize the vehicle backing video display function through the display control program when the vehicle backing indicator indicates vehicle backing; and controlling the processor to load the operating system program when the vehicle backing indicator does not indicate vehicle backing.

According to another embodiment of the present invention, a booting display control apparatus is disclosed. The booting display control apparatus comprises a processor chip. The processor chip comprises a processor and a display controller coupled to the processor. After the processor chip is activated, the processor loads the leading program and displays control program, and the processor detects whether a vehicle backing indicator indicates vehicle backing When the vehicle backing indicator indicates vehicle backing, the processor controls the display controller to realize the vehicle backing video display function through the display control program. When the vehicle backing indicator does not indicate vehicle backing, the processor loads the operating system program.

These and other aspects of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
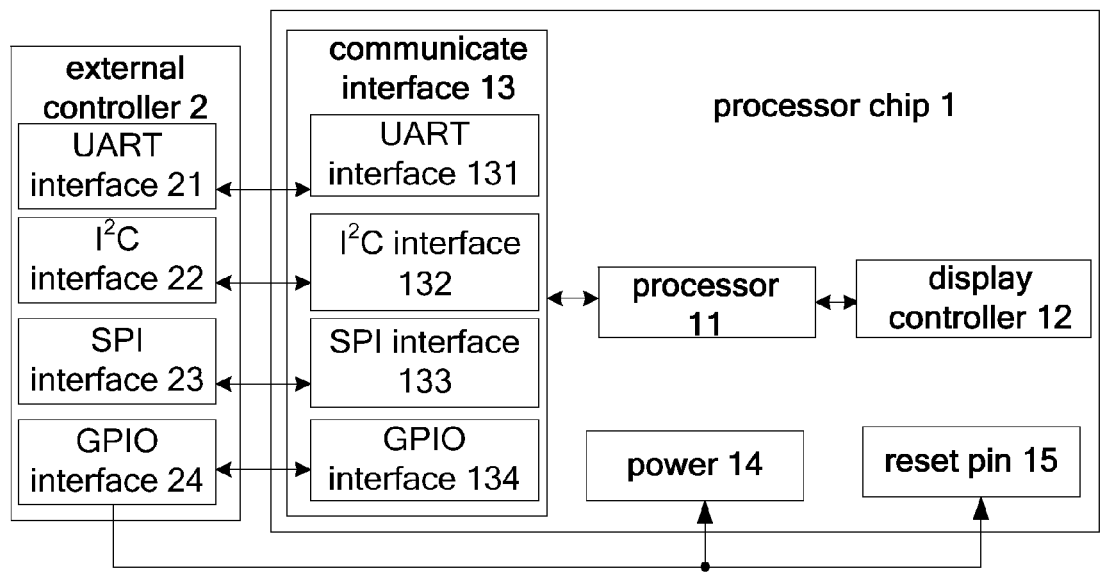
FIG. 1 is a diagram illustrating a booting display control apparatus according to an embodiment of the present invention.

Please refer to FIG. 1, which is a diagram illustrating a booting display control apparatus according to an embodiment of the present invention. As shown in FIG. 1, the apparatus includes a processor chip 1 and an external controller 2.

The processor chip 1 controls the booting display of automotive electronics, for instance, vehicle backing video display while booting. In this embodiment, the processor chip 1 includes a processor 11, a display controller 12, a communication interface 13, a power supply 14 and a reset pin 15.

The processor 11 controls the display controller 12 to realize the booting display function. Specifically, after the processor chip 1 is powered on, the processor 11 loads a leading program and a display control program. After the leading program and the display control program are completely loaded, the processor 11 detects whether a vehicle backing indicator indicates vehicle backing If the vehicle backing indicator indicates vehicle backing, the processor 11 controls the display controller 12 to realize the vehicle backing video display function through the display control program; else, if the vehicle backing indicator does not indicate vehicle backing, the processor 11 loads the operating system program.

Furthermore, after the operating system program is completely loaded, the processor 11 keeps detects whether the vehicle backing indicator indicates vehicle backing. If the vehicle backing indicator indicates vehicle backing, the processor 11 will control the display controller 12 to realize the vehicle backing video display function through the display control program.

The communicate interface 13 is coupled to the external controller 2, and is responsible for data transmission between the external controller 2 and the processor chip 1. The communicate interface 13 obtains the vehicle backing indicator from the external controller 2, and passes the loading status of the OS program to the external controller 2.

Specifically, the communication interface 13 includes a Universal Asynchronous Receiver/Transmitter (UART) interface 131, an Inter-Integrated Circuit ($I^2C$) interface 132, a Serial Peripheral Interface (SPI) interface 133 and a General Purpose Input/Output (GPIO) interface 134. The processor chip 1 obtains the vehicle backing indicator from the external controller 2 and passes the loading status of the OS program to the external controller 2 via at least one of the UART interface 131, the $I^2C$ interface 132, the SPI interface 133 and the GPIO interface 134.

The external controller 2 detects vehicle backing status of vehicle backing control signal recursively, and passes the vehicle backing indicator corresponding to the vehicle backing status to the processor 11. Furthermore, the external controller 2 detects loading status of the operating system program recursively, and reactivates the processor chip 1 according to the vehicle backing status and/or the loading status of the OS program.

Specifically, the external controller 2 includes a UART interface 21, an $I^2C$ interface 22, an SPI interface 23 and a GPIO interface 24, which are coupled to the UART interface 131, the $I^2C$ interface 132, the SPI interface 133 and the GPIO interface 134 of the processor chip 1 respectively. The external controller 2 obtains the loading status of the OS program from the processor chip 1 and passes the vehicle backing indicator to the processor chip 1 via at least one of the UART interface 21, the $I^2C$ interface 22, the SPI interface 23 and the GPIO interface 24.

The GPIO interface 24 of the external controller 2 is coupled to the power supply 14 and the reset pin 15 of the processor chip 1 respectively. The external controller 2 resets the processor chip 1 by controlling the power supply 14 or the reset pin 15 of the processor chip 1 via the GPIO interface 24.

Figure 2:
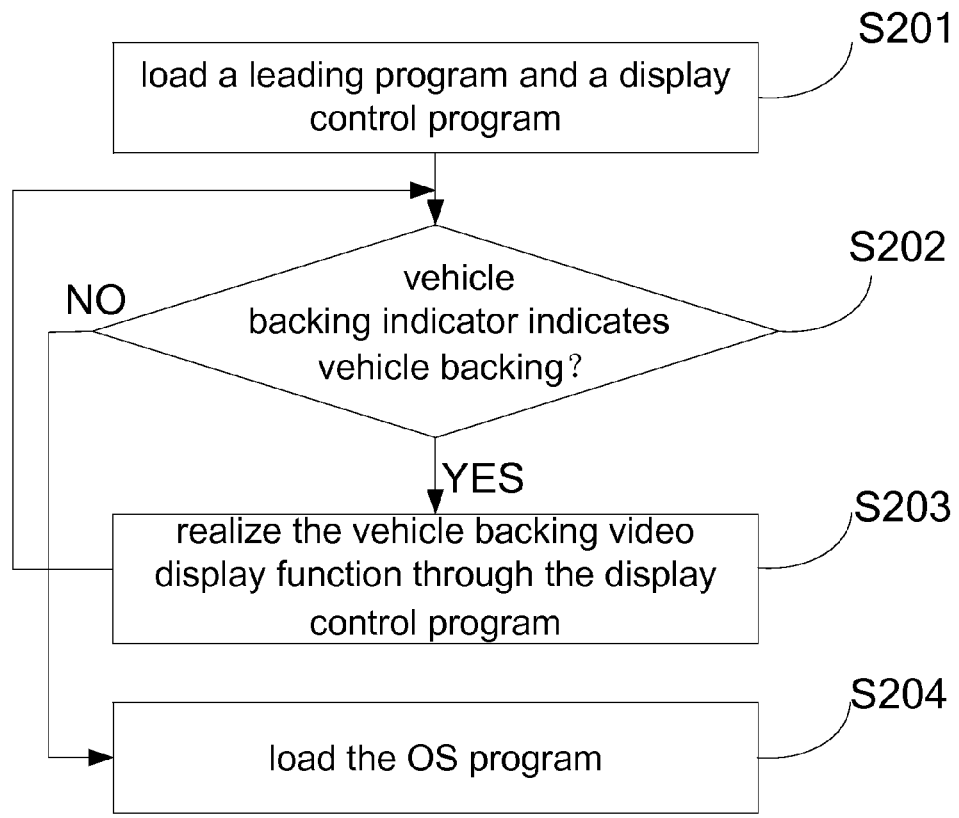
FIG. 2 is a flowchart illustrating a booting display control method according to a first embodiment of the present invention.

FIG. 2 is a flowchart illustrating a booting display control method according to a first embodiment of the present invention. The method illustrated in FIG. 2 may be implemented by the apparatus shown in FIG. 1. Provided that substantially the same result is achieved, the steps of the flowchart shown in FIG. 2 need not be in the exact order shown and need not be contiguous, that is, other steps can be intermediate. Besides, some steps in FIG. 2 may be omitted according to various embodiments or requirements. The method may be briefly summarized as follows.

Step S201: After the processor chip 1 is activated, control the processor 11 to load a leading program and a display control program;

Step S202: Control the processor 11 to detect whether a vehicle backing indicator indicates vehicle backing; if the vehicle backing indicator indicates vehicle backing, go to step S203; else, go to step S204;

Step S203: Using the processor 11 to control the display controller 12 to realize the vehicle backing video display function through the display control program, and go to step S202;

Step S204: Using the processor 11 to load the OS program.

In step S201, The processor 11 realizes the vehicle backing video display function during booting by controlling the display controller 12. After powered on, the processer 11 loads the leading program first so as to put the processor 11 in a working status. The leading program is responsible for initializing the hardware devices, building the memory space image, for instance. The processor 11 then loads the display control program to drive the display controller 12 into the working status, wherein the display control program is utilized to realize the vehicle backing video display function.

In Step S202, the processor 11 detects the vehicle backing indicator recursively and determines whether the vehicle backing indicator indicates vehicle backing. Specifically, the processor 11 detects the vehicle backing indicator and determines whether the vehicle backing indicator indicates vehicle backing every predetermined time interval.

In Step S203, when the processer 11 detects the vehicle backing indicator indicates vehicle backing, the processor 11 suspends loading the OS program, and controls the display controller 12 to perform the vehicle backing video display function through the display control program.

In step S204, when the processor 11 detects the vehicle backing indicator does not indicate vehicle backing, the processor 11 loads the OS program.

According to the aforementioned booting display control method of the first embodiment of the present invention, when the vehicle backing indicator indicates vehicle backing, the processor performs the vehicle backing video display function by the display controller via the display control program; when the processor detects the vehicle backing indicator indicates no vehicle backing, the processor loads the OS program, and thereby an extra video decoder chip is needless for performing the vehicle backing display before the OS program is completely loaded. In this way, cost can be significantly reduced.

Figure 3:
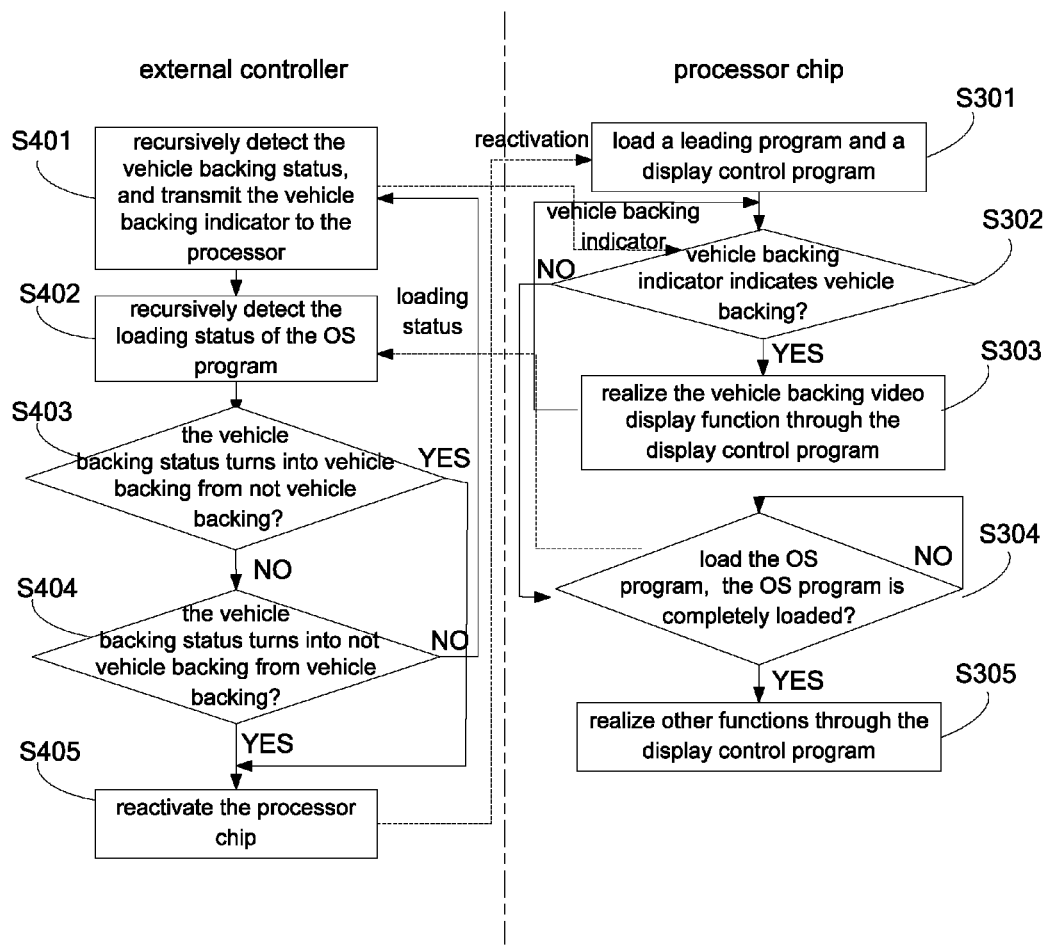
FIG. 3 is a flowchart illustrating a booting display control method according to a second embodiment of the present invention.

FIG. 3 is a flowchart illustrating a booting display control method according to a second embodiment of the present invention, wherein the method is based on the apparatus shown in FIG. 1. Provided that substantially the same result is achieved, the steps of the flowchart shown in FIG. 3 need not be in the exact order shown and need not be contiguous, that is, other steps can be intermediate. Besides, some steps in FIG. 3 may be omitted according to various embodiments or requirements. The method may be briefly summarized as follows.

After the processor chip 1 is powered on or reactivated, the following steps will be performed:

Step S301: Load a leading program and a display control program;

Step S302: Detect whether a vehicle backing indicator indicates vehicle backing, if the vehicle backing indicator indicates vehicle backing, go to step S303; else, go to step S304;

Step S303: Realize the vehicle backing video display function through the display control program, go to step S302;

Step S304: Load the OS program and determine whether the OS program is completely loaded, if the OS program is completely loaded, go to Step S305; else, go to Step S304; in Step S304, the processor 11 sends the loading status to the external controller 2 as a signal for allowing the external controller 2 to perform Step S402.

Step S305: Realize other functions through the display control program; for example, in Step S305, when the OS program is completely loaded, if the vehicle backing indicator indicates vehicle backing, the processor 11 runs the vehicle backing application program of the OS program to control the display controller 12 to display the vehicle backing video.

After the external controller 2 is powered on, the following steps will be performed:

Step S401: Recursively detect the vehicle backing status indicated by a vehicle backing control signal, and transmit the vehicle backing indicator corresponding to the vehicle backing status to the processor 1;

In Step S401, the vehicle backing control signal may be obtained by detecting the currently gear, for instance. When the vehicle is not using the reverse gear, the vehicle backing control signal will indicate no vehicle backing When the gear is changed to the reverse gear from non-reverse gears, the vehicle backing control signal will indicate the vehicle status turns into vehicle backing. When the vehicle is using the reverse gear, the vehicle backing control signal will indicate vehicle backing When the gear is changed to the non-reverse gears from the reverse gear, the vehicle backing control signal will indicate the vehicle status turns into no vehicle backing from vehicle backing, i.e., vehicle backing is ended.

The external controller 2 detects the vehicle backing status indicated by the vehicle backing control signal for every predetermined time interval, and transmits the vehicle backing indicator corresponding to the vehicle backing status to the processor 11 through the communication interface 13 which is arranged between the external controller 2 and the processor chip 1, such as the UART interface 131, the I²C interface 132, the SPI interface 133 or the GPIO interface 134.

Taking the GPIO interface 134 for example, the status of the GPIO interface may be used to represent the vehicle backing status. A high voltage level of the GPIO interface may correspond to the vehicle backing status and a low voltage level of the GPIO interface may correspond to the no vehicle backing status. The change of voltage level of the GPIO interface from low to high corresponds to a change of vehicle status from a no vehicle backing status to a vehicle backing status. And the change of voltage level of the GPIO interface from high to low corresponds to a change of vehicle status from a vehicle backing status to a no vehicle backing status.

Specifically, in the case that the vehicle backing indicator indicates vehicle backing, when the external controller 2 detects the vehicle backing control signal indicates vehicle backing, the external controller 2 pulls the voltage of the GPIO interface 134 to a high level. The processor 11 recursively detects the voltage level of the GPIO interface 134. When the processor 11 detects the voltage level of the GPIO interface 134 is high, it's informed the vehicle is backing.

Step S402: Recursively detect the loading status of the OS program;

In Step S402, the external controller 2 detects the loading status of the OS program for every predetermined time interval. The loading status of the OS program may be transmitted to the external controller 2 by the processor 11 through the communication interface 13 between the external controller 2 and the processor chip 1, the communication interface 13 such as the UART interface 131, the I2C interface 132, the SPI interface 133 or the GPIO interface 134.

Taking the GPIO interface 134 for example, the status of the GPIO interface may be used to represent the loading status. A high voltage level of the GPIO interface 134 may correspond to that the loading is completed and the low voltage level of the GPIO interface 134 may correspond to that the loading is not completed.

Specifically, the processor 11 first sets the initial state of the internal GPIO interface 134 of the processor chip 1 to a low voltage level. Once the processor 11 has completed loading of the OS program, the processor 11 pulls the voltage of the GPIO interface to a high level. The external controller 2 recursively detects the voltage level of the internal GPIO interface 134. When the external controller 2 detects the voltage level of the GPIO interface 134 is low, it's informed the loading status of the OS program is not completed. When the external controller 2 detects the voltage level of the GPIO interface 134 is high, it's informed the loading status of the OS program is completed.

Step S403: Detect whether the vehicle backing status turns into vehicle backing from no vehicle backing, if yes, go to Step S405; else, go to Step S404;

Step S404: Detect whether the vehicle backing status turns into no vehicle backing from vehicle backing, if yes, go to Step S405; else, go to Step S401;

Step S405: Reactivate the processor chip 1.

In Step S405, the external controller 2 may reactivate the processor chip 1 by controlling power or reset pin of the processer chip 1 via the GPIO interface 134.

According to the aforementioned booting display control method of the second embodiment of the present invention, during the process of loading the OS program, if the external controller 2 detects the vehicle backing status turns into vehicle backing from no vehicle backing, it reactivates the processor chip 1 to realize the vehicle backing video display function during system booting. Thereby an extra video decoder chip is needless for performing the vehicle backing display before the OS program is completely loaded. In this way, cost can be significantly reduced.

Figure 4:
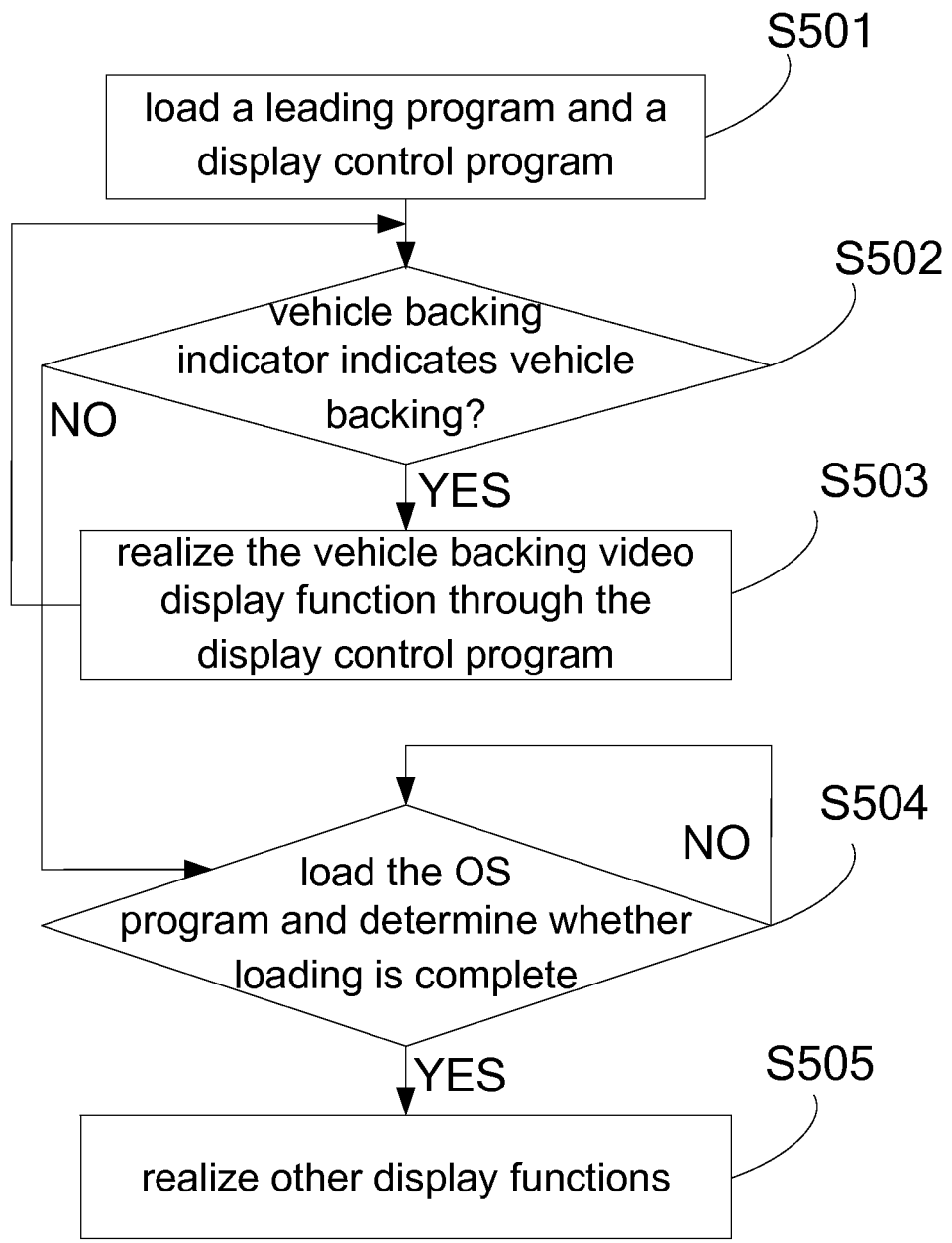
FIG. 4 is a flowchart illustrating a processor chip based booting display control method according to a third embodiment of the present invention.
Figure 5:
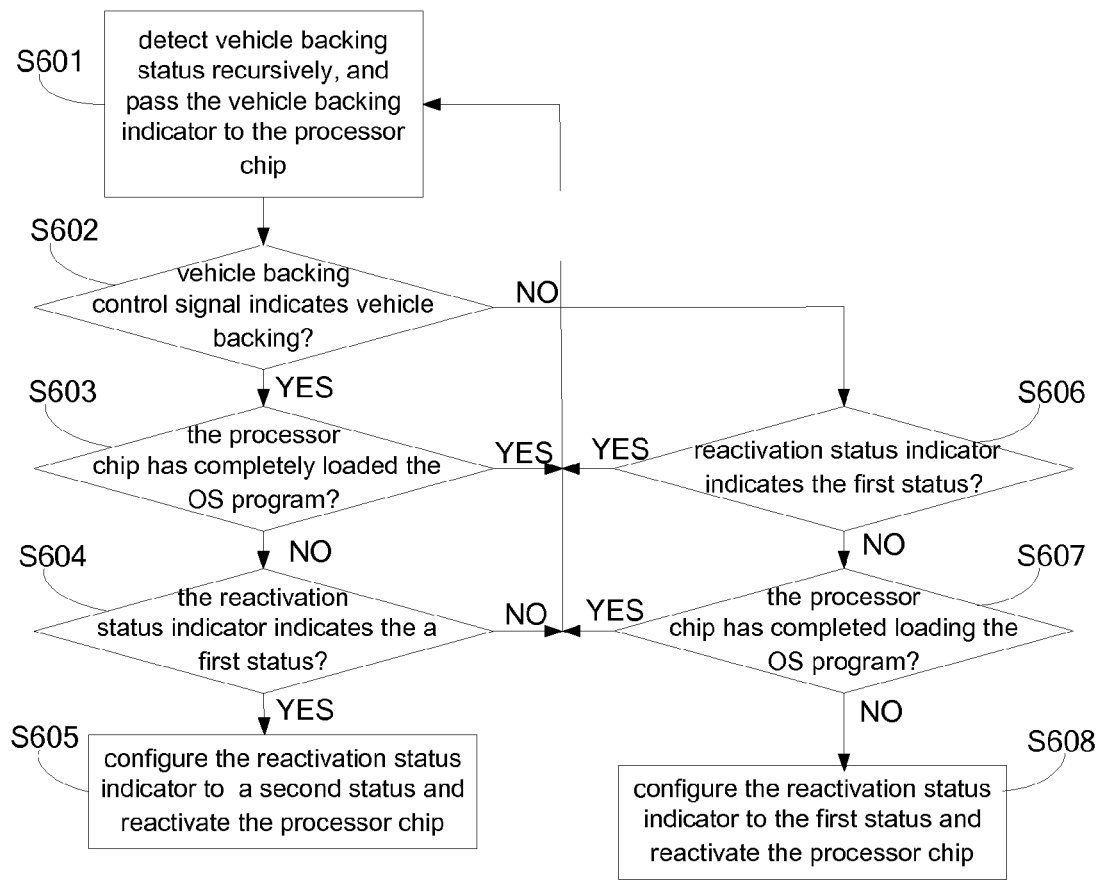
FIG. 5 is a flowchart illustrating an external controller based booting display control method according to a third embodiment of the present invention.

FIG. 4 is provided in conjunction with FIG. 5. FIG. 4 is a flowchart illustrating a processor chip based booting display control method according to a third embodiment of the present invention. FIG. 5 is a flowchart illustrating an external controller based booting display control method according to the third embodiment of the present invention. Provided that substantially the same result is achieved, the steps of the flowchart shown in FIG. 4 and FIG. 5 need not be in the exact order shown and need not be contiguous, that is, other steps can be intermediate. Besides, some steps in FIG. 4 and FIG. 5 may be omitted according to various embodiments or requirements. The method may be briefly summarized as follows.

As shown in FIG. 4, the processor chip 1 based booting display control method includes the following steps:

Step S501: Load a leading program and a display control program;

Step S502: Detect whether a vehicle backing indicator indicates vehicle backing; if yes, go to Step S503; else, go to Step S504;

In Step S502, the processor chip 1 receives the vehicle backing control signal from an external controller 2 and determines whether vehicle backing occurs according to the vehicle backing control signal.

Step S503: control the display controller 12 to realize the vehicle backing video display function through the display control program, go to Step S502;

Step S504: Load the OS program and determine whether loading is complete; if the OS program is completely loaded, go to Step S505; else, go to Step S504;

In Step S504, the processor chip 1 transmits a loading status signal to the external controller 2.

Step S505: control the display controller 12 to realize other display functions through the OS program.

As shown in FIG. 5, the external controller 2 based booting display control method includes the following steps:

Step S601: Detect vehicle backing status of vehicle backing control signal recursively, and pass the vehicle backing indicator corresponding to the vehicle backing status to the processor chip 1;

Step S602: Detect whether the vehicle backing control signal indicates vehicle backing; if yes, go to Step S603; else, go to Step S606;

Step S603: Determine whether the processor chip 1 has completely loaded the OS program; if yes, go to Step S601; else go to Step S604;

In Step S603, the external controller 2 receives the loading status signal from the processor chip 1 and determines whether the processor chip has completed loading according to the loading status signal.

In the present invention, if the processor chip 1 has completed loading the OS program, the external controller 2 will no longer execute the processor chip reactivation process.

Step S604: Detect whether the reactivation status indicator indicates a first status; if yes, go to Step S605; else, go to Step S601;

In this embodiment, at the time the external controller 2 is just activated, i.e. before Step S601, the external controller 2 configures the reactivation status indicator to the first status, wherein the first status indicates the processor chip 1 needs to be reactivated.

Step S605: Configure the reactivation status indicator to a second status and reactivate the processor chip 1;

In Step S605, if the OS program is not completely loaded, and the vehicle backing control signal indicates vehicle backing, and the reactivation status indicator indicates the first status, the external controller 2 transmits the reactivation signal to the processor chip 1 to reactivate the processor chip 1, so as to realize the vehicle backing video display function during system booting.

The second status indicates it is needless to reactivate the processor chip 1. The external controller 2 changes the status of the reactivation status indicator from the first status to the second status, so as to avoid duplicating the reactivation process.

Step S606: Detect whether the reactivation status indicator indicates the first status, if yes, go to Step S601; if the reactivation status indicator indicates the second status, go to Step S607;

In this embodiment, when the vehicle backing control signal indicates no vehicle backing and the reactivation status indicator indicates the second status, the vehicle backing status turns into no vehicle backing from vehicle backing When the vehicle backing control signal indicates no vehicle backing and the reactivation status indicator indicates the first status, the vehicle backing status remains no vehicle backing.

Step S607: Determine whether the processor chip has completed loading the OS program, if yes, go to Step S601; else, go to Step S608;

In Step S607, the external controller 2 receives the loading status signal from the processor chip 1 and determines whether the processor chip 1 has completed loading the OS program according to the loading status signal.

Step S608: Configure the reactivation status indicator to the first status and reactivate the processor chip.

In Step S608, when the OS program has not been completely loaded, and the vehicle backing control signal indicates no vehicle backing, and the reactivation status indicates the second status, the external controller 2 transmits the reactivation signal to the processor chip 1 to reactivate the processor chip 1, so as to ensure the processor chip 1 loads the OS program normally.

In addition, the external controller 2 configures the reactivation status indicator to the first status from the second status, to make sure that before the OS program is completely loaded, an accurate corresponding vehicle backing status can be obtained when the vehicle backing process takes place more than once.

Specifically, if the reactivation status indicator is not changed from the second status to the first status, in a case where the vehicle backing takes place again during the OS program loading process, the vehicle backing video will not be able to be displayed during system booting since the external controller will not reactivate the processor chip 1 according to the vehicle backing indicator (which indicates vehicle backing) and the reactivation status indicator (which indicates the second status).

According to the aforementioned booting display control method of the third embodiment of the present invention, during the OS program loading process, the external controller 2 reactivates the processor chip 1 to realize the vehicle backing video display function during booting through the processor chip 1 after accurately detecting the vehicle backing status (which changes from no vehicle backing to vehicle backing) according to the reactivation status indicator. Thereby, an extra video decoder chip is needless for performing the vehicle backing display before the OS program is completely loaded. In this way, cost can be significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A booting display control method, based on a processor chip which comprises a processor and a display controller, wherein the method comprises:
    loading a leading program and a display control program by the processor after the processor chip is activated;
    detecting whether a vehicle backing indicator indicates vehicle backing by the processor;
    when the vehicle backing indicator indicates vehicle backing, executing the vehicle backing video display function through the display control program by the display controller; and
    when the vehicle backing indicator does not indicate vehicle backing, loading an operating system program by the processor.

2. The booting display control method of claim 1, further comprising:
    after the operating system program is completely loaded, controlling the display controller to execute the vehicle backing video display function by the processor through the display control program when the vehicle backing indicator indicates vehicle backing.

3. The booting display control method of claim 1, further comprising:
    detecting vehicle backing status of vehicle backing control signal recursively by utilizing an external controller; and
    passing the vehicle backing indicator corresponding to the vehicle backing status to the processor.

4. The booting display control method of claim 3, further comprising:
   detecting a loading status of the operating system program recursively by utilizing the external controller; and
   when the external controller detects that the vehicle backing status turns into vehicle backing from no vehicle backing and the operating system program is not completely loaded, reactivating the processor chip.

5. The booting display control method of claim 4, further comprising:
   when the external controller detects that the vehicle backing status turns into no vehicle backing from vehicle backing and the operating system program is not completely loaded, reactivating the processor chip.

6. The booting display control method of claim 5, wherein the step of reactivating the processor chip further comprises:
   controlling power or a reset pin of the processer chip via a General Purpose Input/Output (GPIO) interface to reactivate the processor chip.

7. The booting display control method of claim 4, wherein the step of reactivating the processor chip further comprises:
   controlling power or a reset pin of the processer chip via a General Purpose Input/Output (GPIO) interface to reactivate the processor chip.

8. The booting display control method of claim 4, wherein the step of detecting the vehicle backing status of the vehicle backing control signal recursively by utilizing the external controller further comprises:
   when the external controller is activated and the vehicle backing indicator indicates no vehicle backing, configuring a reactivation status indicator to a first status;
   detecting whether the vehicle backing control signal indicates vehicle backing, and detecting whether the reactivation status indicator indicates the first status;
   when the vehicle backing control signal indicates vehicle backing, and the reactivation status indicator indicates the first status, determining the vehicle backing status turns into vehicle backing from no vehicle backing, and configuring the reactivation status indicator to a second status; and
   when the vehicle backing control signal indicates no vehicle backing, and the reactivation status indicator indicates the second status, determining the vehicle backing status turns into no vehicle backing from vehicle backing, and configuring the reactivation status indicator to the first status.

9. A booting display control apparatus, including a processor chip, wherein the processor chip comprises:
   a processor; and
   a display controller, coupled to the processor;
   wherein after the processor chip is activated, the processor loads a leading program and a display control program; the processor detects whether a vehicle backing indicator indicates vehicle backing; when the vehicle backing indicator indicates vehicle backing, the processor controls the display controller to execute the vehicle backing video display function through the display control program; and when the vehicle backing indicator does not indicate vehicle backing, the processor loads an operating system program.

10. The booting display control apparatus of claim 9, wherein after the operating system program is completely loaded, the processor controls the display controller to execute the vehicle backing video display function through the display control program when the vehicle backing indicator indicates vehicle backing.

11. The booting display control apparatus of claim 9, wherein the apparatus further comprises:
   an external controller, coupled to the processor chip, wherein the external controller detects vehicle backing status of vehicle backing control signal recursively, and passes the vehicle backing indicator corresponding to the vehicle backing status to the processor.

12. The booting display control apparatus of claim 11, wherein the external controller detects loading status of the operating system program recursively; when the external controller detects that the vehicle backing status turns into vehicle backing from no vehicle backing and the operating system program is not completely loaded, the external controller reactivates the processor chip.

13. The booting display control apparatus of claim 12, wherein when the external controller detects that the vehicle backing status turns into no vehicle backing from vehicle backing and the operating system program is not completely loaded, the external controller reactivates the processor chip.

14. The booting display control apparatus of claim 13, wherein the external controller controls power or a reset pin of the processer chip via a General Purpose Input/Output (GPIO) interface to reactivate the processor chip.

15. The booting display control apparatus of claim 12, wherein the external controller controls power or a reset pin of the processer chip via a GPIO interface to reactivate the processor chip.

16. The booting display control apparatus of claim 12, wherein
   when the external controller is activated and the vehicle backing indicator indicates no vehicle backing, the external controller configures a reactivation status indicator to a first status;
   the external controller detects whether the vehicle backing control signal indicates vehicle backing, and detects whether the reactivation status indicator indicates the first status;
   when the vehicle backing control signal indicates vehicle backing, and the reactivation status indicator indicates the first status, the external controller determines the vehicle backing status turns into vehicle backing from no vehicle backing, and configures the reactivation status indicator to a second status; and
   when the vehicle backing control signal indicates no vehicle backing, and the reactivation status indicator indicates the second status, the external controller determines the vehicle backing status turns into no vehicle backing from vehicle backing, and configures the reactivation status indicator to the first status.

* * * * *